US005799572A

United States Patent [19]

Campbell et al.

[11] Patent Number: 5,799,572

[45] Date of Patent: Sep. 1, 1998

[54] TREATMENT OF CROPS AND FIBROUS MATERIALS

[75] Inventors: Kim Antony Campbell, Five Dock; Paul Thomas McCardell, Arncliffe, both of Australia

[73] Assignee: Riyate Pty Limited, Sydney, Australia

[21] Appl. No.: 918,576

[22] PCT Filed: May 6, 1994

[86] PCT No.: PCT/AU94/00236

§ 371 Date: Feb. 9, 1996

§ 102(e) Date: Feb. 9, 1996

[87] PCT Pub. No.: WO94/26091

PCT Pub. Date: Nov. 24, 1994

Related U.S. Application Data

[63] Continuation of Ser. No. 549,691, Feb. 9, 1996, abandoned.

[30] Foreign Application Priority Data

May 6, 1993 [AU] Australia ................................ PL8681

[51] Int. Cl.[6] ........................... B30B 15/34; A23N 17/00

[52] U.S. Cl. ................................ 100/38; 100/35; 100/73; 100/74; 100/303; 100/304; 100/315

[58] Field of Search ........................... 100/35, 38, 73–75, 100/92, 93 R, 93 P, 303, 304, 315, 100, 101

[56] References Cited

U.S. PATENT DOCUMENTS

| | | | |
|---|---|---|---|
| 1,688,524 | 10/1928 | Cobb | 100/73 |
| 1,946,814 | 2/1934 | Sims | 100/38 |
| 2,942,976 | 6/1960 | Kosch | 100/906 |
| 3,163,131 | 12/1964 | Lundell | 100/73 |
| 3,352,229 | 11/1967 | Morse | 100/38 |
| 3,871,291 | 3/1975 | Lassiter | 100/38 |
| 4,862,559 | 9/1989 | Roder et al. | 19/66 R |
| 4,916,888 | 4/1990 | Sheehan et al. | 100/74 |
| 5,022,317 | 6/1991 | Williams | 100/35 |

FOREIGN PATENT DOCUMENTS

| | | | |
|---|---|---|---|
| 243206 | 2/1987 | Germany | 100/92 |
| 728829 | 4/1980 | U.S.S.R. | |
| 80/02835 | 12/1980 | WIPO | 100/92 |

*Primary Examiner*—Stephen F. Gerrity

*Attorney, Agent, or Firm*—Abelman, Frayne & Schwab

[57] ABSTRACT

A method of and apparatus (10) for compacting harvested crop or fiber (30) such as wool or hay; the method comprising applying a mechanical compacting force to the crop or fiber at the same time as or immediately after subjecting the crop or fiber to an elevated temperature above a base reference temperature and/or an elevated moisture content condition above a base reference moisture content condition whereby the crop or fiber (30) is compressed to a compressed state of predetermined density using less compacting force than would otherwise be the case. The method and apparatus can also be applied to control moisture content and certain other storage characteristics through utilization of compaction apparatus (10) on its own or in conjunction with a pre-processor (35) or post-processor (36) or both.

22 Claims, 7 Drawing Sheets

TREATMENT OF CROPS AND FIBROUS MATERIALS

This application is a Continuation application of prior application Ser. No. 08/549,691 filed on Feb. 9, 1996 (abandoned).

FIELD OF THE INVENTION

The present invention relates to a method and apparatus for the compaction of crops and certain other materials of a fibrous nature.

The apparatus of the invention can be utilised as either a mobile or stationary apparatus.

BACKGROUND ART

In the area of crop transport and storage, a particular problem of the prior art is concerned with compaction of the crop to the optimum density. A specific example occurs in the matter of filling containers which are of fixed volume and shape and designated for a fixed maximum payload. In this situation, there will be a given crop density for a crop which will exactly fill the volume of the container at the maximum allowable weight. A crop which is more dense than this predetermined density will reach the maximum allowable payload weight before entirely filling the volume of the container. Equally, a crop of less density will entirely fill the volume of the container but will not reach the maximum allowable payload. In the overdense case, unnecessary energy has been expended on compacting the crop for no gain. In the underdense situation, the container is being under utilised and therefore transport of the crop is inefficient leading to additional expense.

Currently, compaction of crop or fiber is performed by a system known as "double dumping" or "triple dumping" wherein the crop is either teased apart and then recompacted or simply compacted to a high degree using mechanical force upon crop that has previously been cured to an appropriate moisture content.

A subsidiary problem is control or management of moisture content of the crop or fiber immediately before, during and immediately after compaction.

In particular, moisture content or storage under compressed conditions may not be the desired moisture content for harvesting. Treatment of crops in order to alter or control their moisture content at the time of harvesting and so as to provide better or optimum harvest moisture content conditions for a crop is addressed in Australian Patent No. 561,014 (see also U.S. Pat. No. 4,254,605 and U.S. Pat. No. 4,604,857).

These prior art patents do not address compaction efficiency problems and/or humidity control problems consequent or in relation to compaction processes.

DISCLOSURE OF THE INVENTION

In the description to follow, the terms "fiber", "fibrous" and "crop" are to be taken in a broad sense and are to include that which is harvested whether from plants or animals, and which will be referred to hereinafter collectively as "crop or fiber".

Also, in the description which follows, the term "fibrous" or "fiber" refers to organic materials which are made up of elongate strands such as harvested hay, bagasse, straw, shorn wool, cotton, jute or kenaff.

In the description which follows the term "ambient" or "base reference" applied to the temperature and/or moisutre content or humidity of a crop or fiber is to be taken as that temperature and/or moisture content at which the crop or fiber presents itself for processing by the method or apparatus of the invention described and claimed in this specification.

In references to elevation of temperature and/or moisture content above ambient in relation to crops or fibers it should be understood that such references do not extend to an elevation of temperature or moisture content to a level where the crop or fiber will be permanently adversely affected either immediately or in terms of its medium to long term storage characteristics.

It is an object of the present invention to provide enhanced or improved means and a method of compact crop or fiber so as to overcome or ameliorate one or more of the above mentioned disadvantages and/or to provide cost advantages in relation to storage, handling and transport of harvested crops.

Accordingly, in one broad form of the invention, there is provided a method of compacting harvested crop or fiber; said method comprising applying a mechanical compacting force to said crop or fiber at the same time as or immediately after subjecting said crop or fiber to an elevated temperature above a base reference temperature and/or an elevated moisture content condition above a base reference moisture content condition whereby said crop or fiber is compressed to a compressed state of predetermined density using less compacting force than would otherwise be the case.

Preferably said method is applied so that said crop or fiber has a greater tendency to remain in said compressed state after removal of said mechanical compacting force than would otherwise be the case.

In a particular preferred form, the method further includes the integral step of conditioning the crop or fiber to a satisfactory moisture content in compacted form.

In a further particular preferred form said steps of subjecting said crop or fiber to an elevated temperature and/or an elevated moisture content condition are performed by applying steam to said crop or fiber.

In an alternative particular preferred form, said steps of subjecting said crop or fiber to an elevated temperature and/or an elevated moisture content condition are performed respectively by the application of microwave energy and the application of steam or micro sprays.

In yet a further particular preferred form, moisture is removed from said crop, as appropriate, either before compaction or quickly after compaction by subjecting said crop or fiber to superheated steam.

Alternatively, moisture can be removed by application of a hot air blast preferably in conjunction with the application of heat by other means (for example, microwave heating).

In a further broad form of the invention, there is provided apparatus for compacting a harvested fibrous crop or fiber said apparatus including mechanical compacting means adapted to compress or compact said crop or fiber; said apparatus further including heating means and/or moisture content altering means; said heating means adapted to heat said crop or fiber during compaction or prior to compaction to an elevated temperature above a base reference temperature; said moisture content altering means adapted to apply an elevated moisture content condition above a base reference moisture content condition during compaction or prior to compaction to said crop or fiber whereby said crop is compressed to a compressed state of predetermined density using less compacting force than would otherwise be the case.

Preferably said crop or fiber has a greater tendency to remain in said compressed state after removal of said crop or fiber from said apparatus than would otherwise be the case.

Preferably a by-product or consequence of the application of said apparatus is that said crop or fiber is also conditioned by said apparatus so as to have a satisfactory moisture content in compacted form.

In a particular preferred form, said mechanical compacting means comprises a combination or groups of generally opposed planar plates.

Preferably said groups act through different axes more preferably, said groups act through mutually orthogonally opposed axes.

Preferably said heating means comprises microwave generation means which heats only said crop or fiber and not said mechanical compacting means.

Preferably said moisture content altering means comprises a source of steam or of super heated steam or of a fine mist spray of water.

In an alternative preferred worm, steam generating means (either ordinary steam where moisture content of the crop is to be increased or superheated steam where the moisture content of the crop or fiber is to be decreased) is utilised both as said heating means and as said moisture content altering means.

In a further particular preferred form said apparatus further includes crop pre-treatment means for altering the moisture content of said crop or fiber prior to treatment by said mechanical compacting means.

In yet a further preferred form, said apparatus further includes post treatment means for altering the moisture content of said crop or fiber after compaction by said mechanical compacting means.

BRIEF DESCRIPTION OF THE DRAWINGS

In order that the invention may be more readily understood and put into practical effect, reference will now be made to the drawings in which.

MODES FOR CARRYING OUT THE INVENTION

Figure 1:
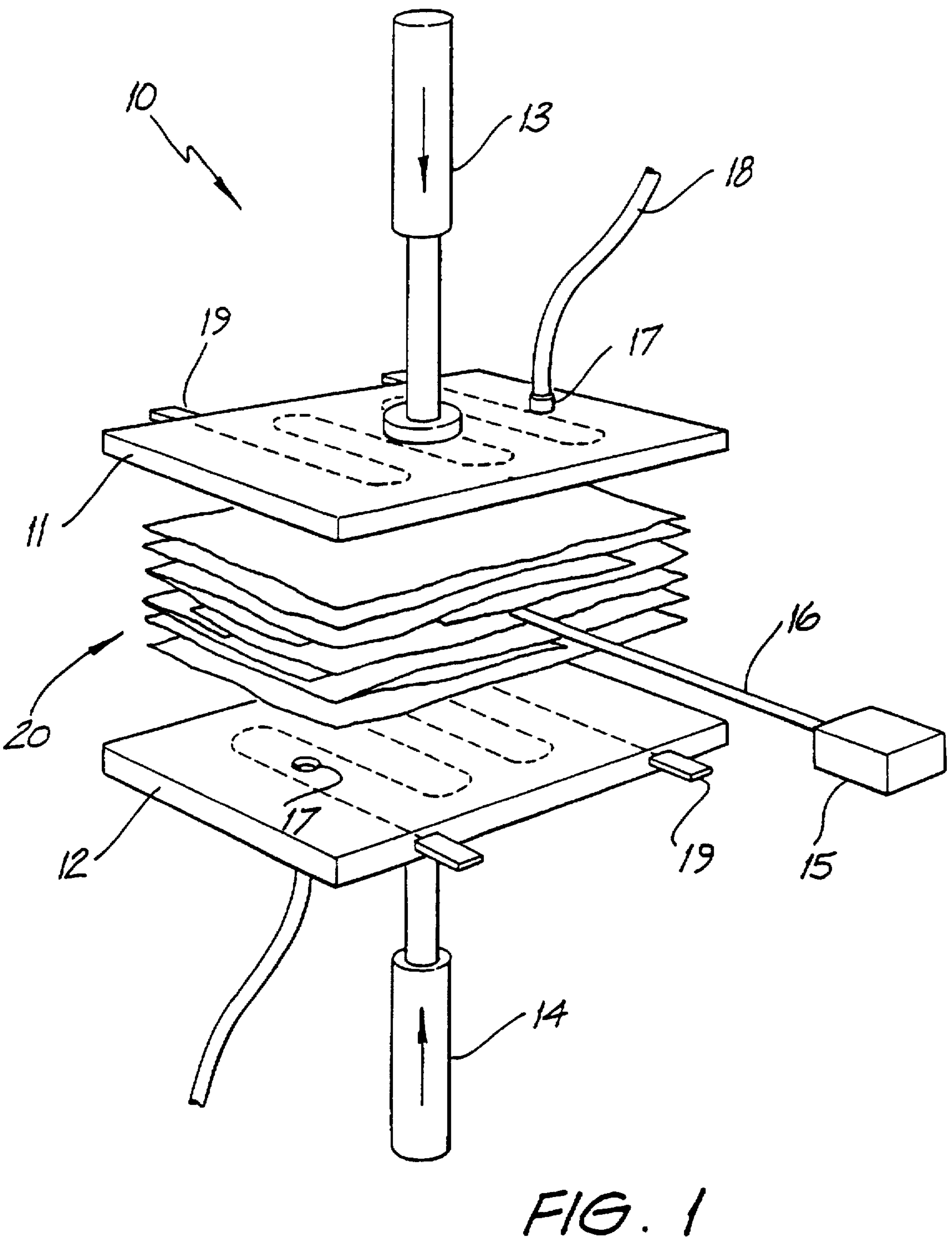
FIG. 1 is a perspective view of a compaction apparatus according to a first embodiment of the invention.

With reference to FIG. 1 the compaction apparatus 10 of a first embodiment comprises two opposed planar plates 11, 12 actuated by pistons 13, 14 which, in turn, are driven by mechanical means such as hydraulic or pneumatic actuators (not shown).

The assembly 10 further includes a sensor 15 having a probe 16 which extends into the volume defined between the plates 11, 12. The sensor 15 is adapted to sense both temperature and moisture content of material located within the volume between the plates 11, 12.

Both plates 11, 12 include one or more steam orifices 17 adapted to conduct steam or heated air by means of pipes 18 into the volume defined between the plates 11, 12.

In addition, heating elements 19 can be embedded in the plates 11, 12 for the purpose of preheating the plates to a predetermined temperature. The heating elements 19 can be of the electrical resistance type or can be steam conduction tubes.

In use a crop or fiber 20 such as hay or wool is placed in the volume defined between the plates 11, 12 whilst the plates are in a spaced apart position (as shown in FIG. 1). The crop or fiber may nave been pre-heated including pre-steaming and/or pre-heating immediately prior to being placed between the plates.

Also, the crop may have been pre-treated to alter its moisture content (see for example Example 4 later).

Sensor 15 communicates the precompression temperature and moisture content of the crop or fiber 20 to control means (not shown). On the basis of this information, the control means causes plates 11 and 12 to be urged towards each other so as to compact the crop or fiber 20 located therebetween whilst, at the same time, injecting either heated air, steam or superheated steam by means of orifices 17 into the volume between the plates 11 and 12 so as to adjust the moisture content of the crop under compaction to an elevated humidity condition above a base reference humidity condition and the temperature of the crop under compression to an elevated temperature above a base reference temperature.

Figure 3:
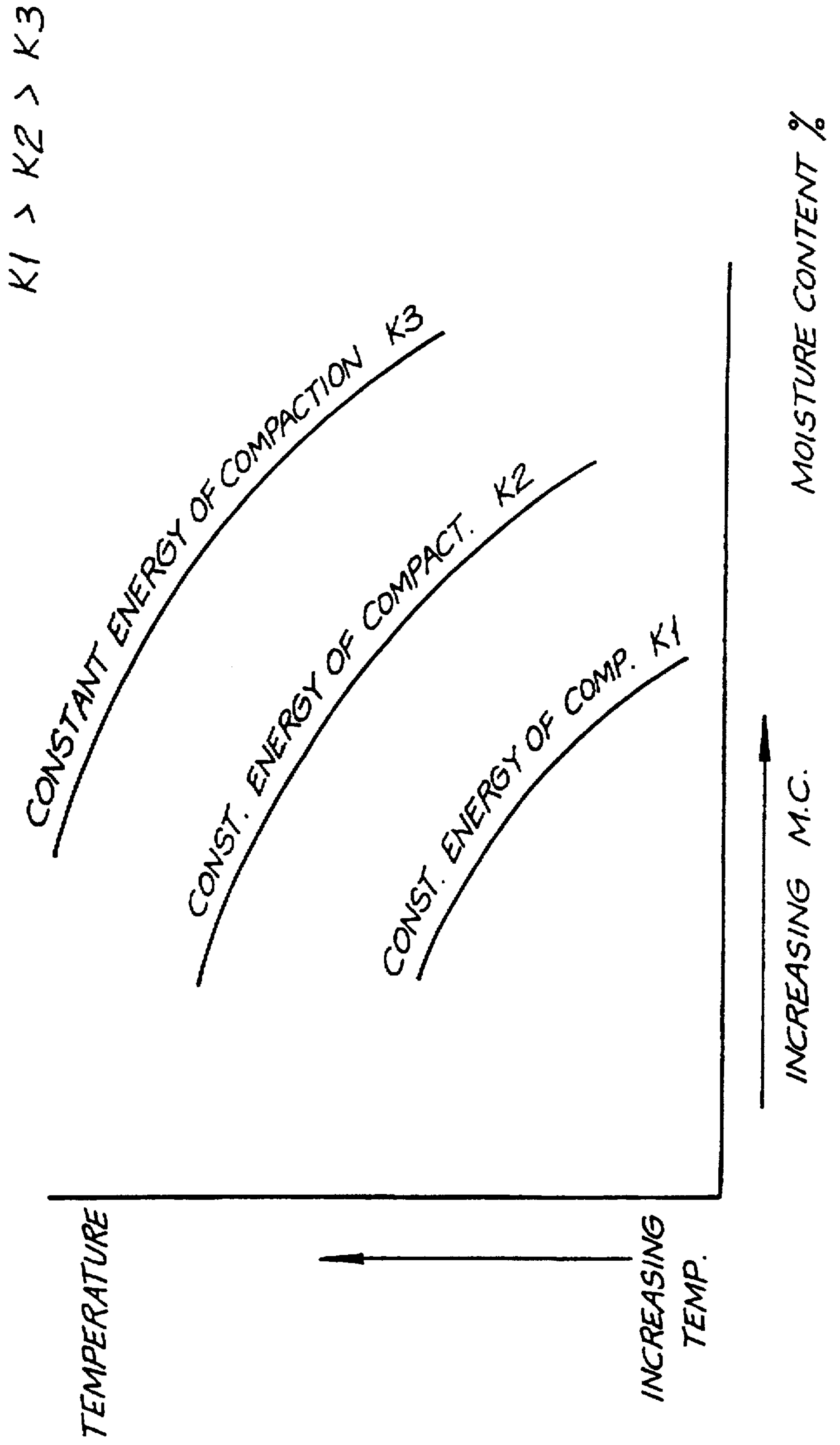
FIG. 3 is a graph of temperature against moisture content graphing lines of constant compaction energy.

As shown in FIG. 3 it has been determined experimentally that the compaction energy per kilogram of crop required to compact the crop reduces as both the temperature and moisture content of the crop under compaction is increased.

Figure 4:
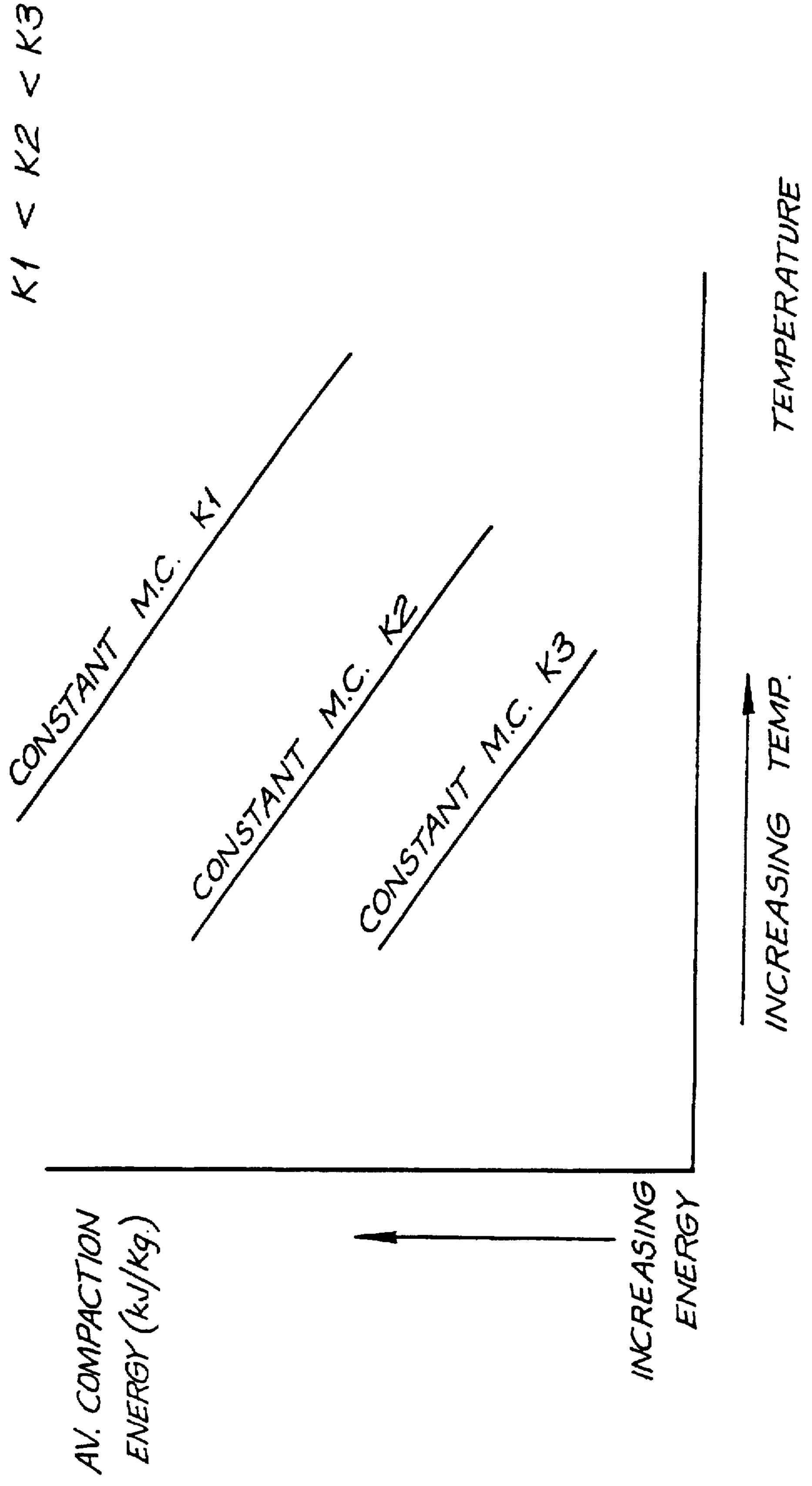
FIG. 4 is a graph of compaction energy against temperature showing lines of constant moisture content.
Figure 5:
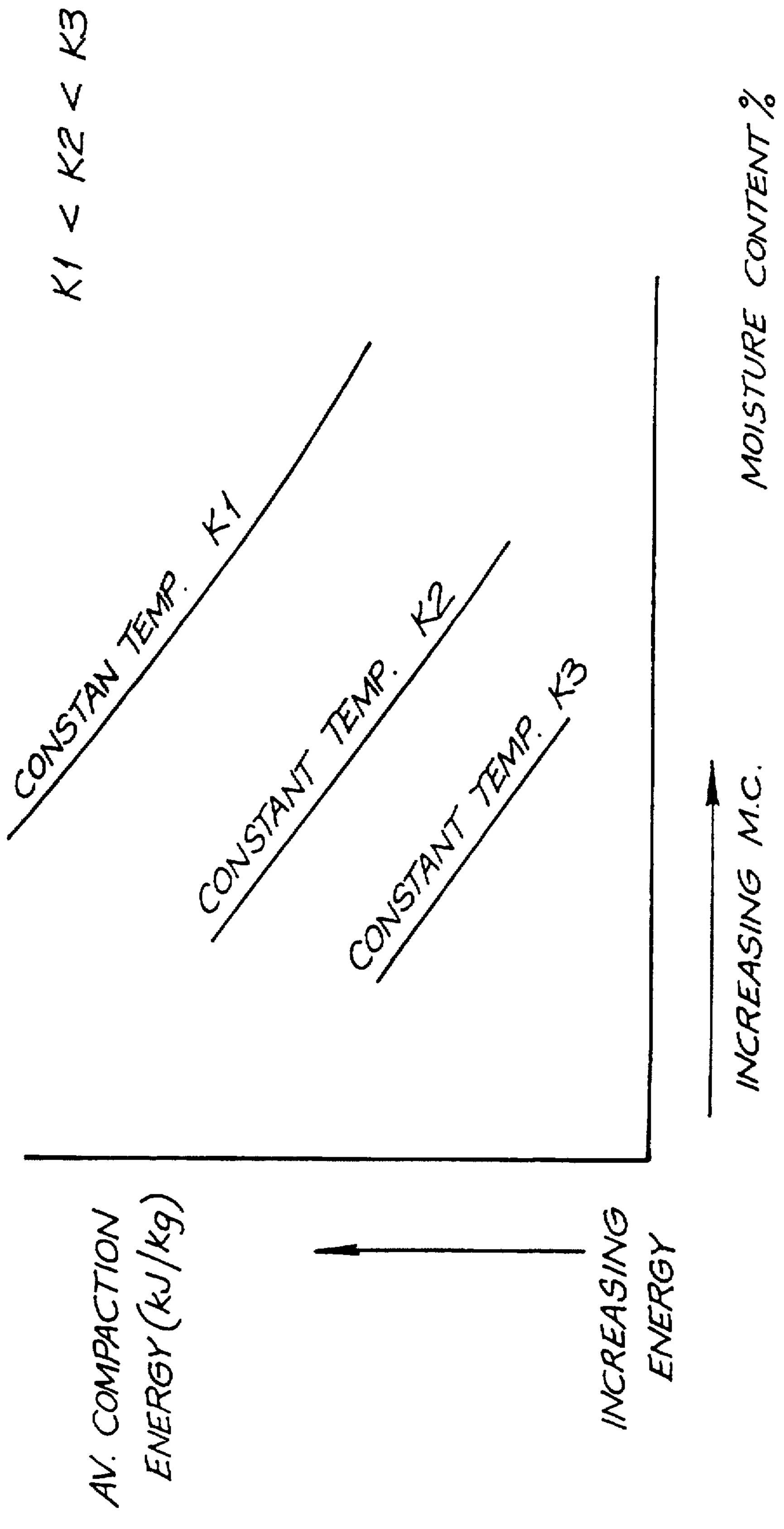
FIG. 5 is a graph of compaction energy against moisture content showing lines of constant temperature.

To support this, FIG. 3 graphs temperature versus moisture content for a set of three different constant compaction energy lines. FIG. 4 graphs compaction energy versus temperature for a series of three different constant moisture content lines whilst FIG. 5 graphs compaction energy versus moisture content for a series of three different constant temperature lanes.

In the first embodiment, the plates 11, 12 are preheated to a predetermined temperature to aid an controlling the environment of the volume between the plates 11, 12.

Figure 2:
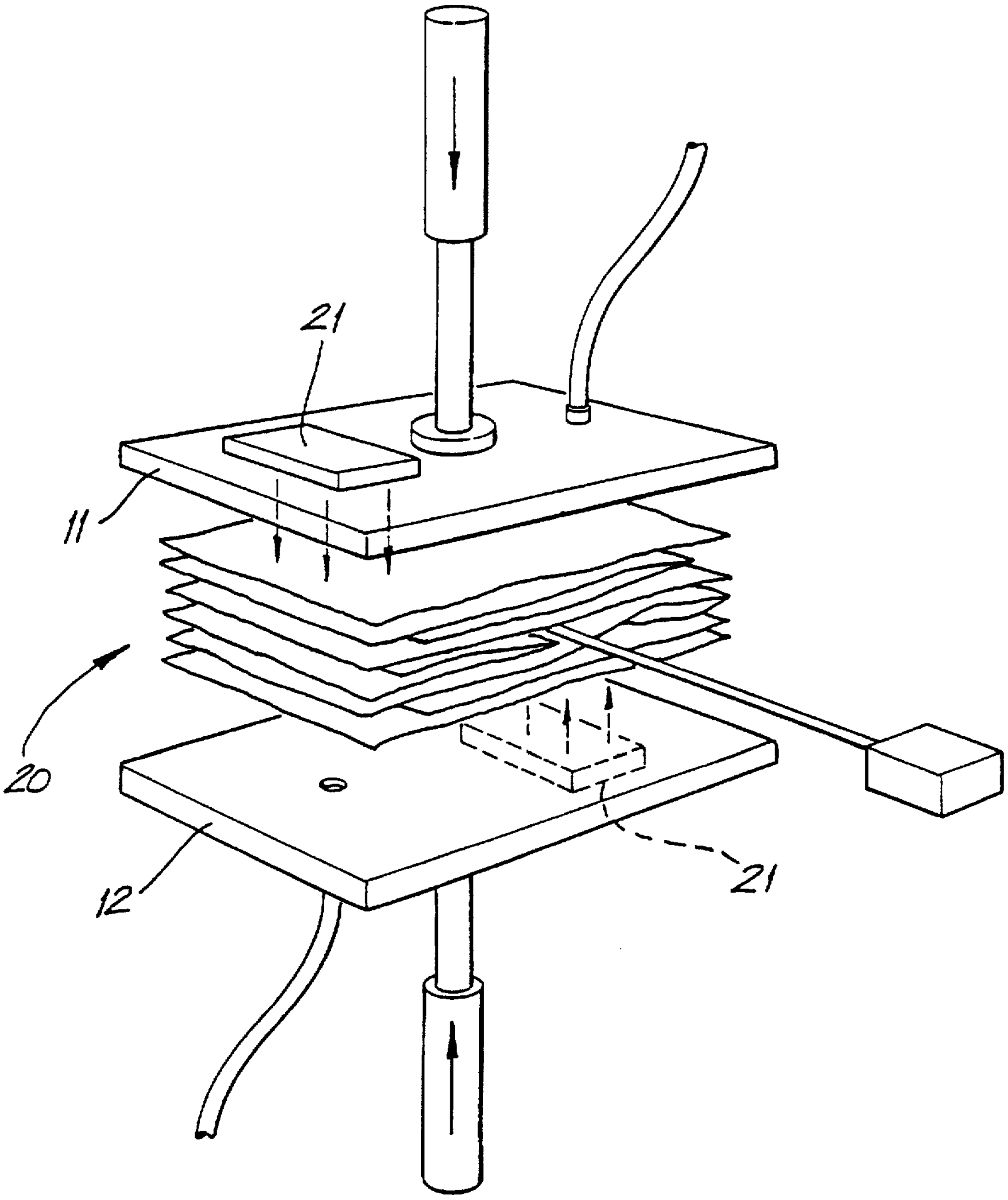
FIG. 2 is a perspective view of a compaction apparatus according to a second embodiment of the invention.

Referring to FIG. 2, a second embodiment is shown wherein the plates 11, 12 are not themselves heated. Instead, a source of microwave energy 21 is applied directly to the crop or fiber 20 for the purpose of providing uniform elevation of crop temperature.

In all other respects, the structure and operation of the second embodiment is the same as that described in respect of the first embodiment.

If the crop or fiber moisture content as sensed by sensor 15 is below the desired elevated humidity condition above the base reference humidity condition, then the control means will utilise steam or a fine water spray (in combination with heating) to elevate the moisture content of the crop 20 injected through orifices 17 so as to elevate the moisture content of the crop or fiber to the desired elevated humidity condition.

If the crop or fiber is determined by sensor 15 to be above the elevated humidity condition, then the control means will utilise superheated steam or heated air injected through orifices 17 to reduce the humidity condition of the crop or fiber down to the desired elevated humidity condition above a base reference humidity condition.

The process of varying the moisture content of the crop or fiber 20 necessarily increases the temperature of the crop or fiber 20. If additional heating is required to achieve the desired elevated temperature above a base reference temperature, then this can be achieved by use of convection heating of the plates 11, 12 (refer FIG. 1) or microwave heating (refer FIG. 2 ).

In one particular variation of the second embodiment, the plates 11, 12 can be made from non-porous material whereby the microwave sources 21 can be placed on the outside of the plates and arranged so as to inject microwaves through the plates 11, 12 and into the volume defined between the plates so as to heat the crop or fiber 20 uniformly without heating the plates, 11, 12 directly.

In addition, the crop can be constrained on the sides of the plates.

In certain circumstances, the crop or fiber to be treated by the compaction apparatus 10 can be treated prior to placement between the plates 11, 12. This can be achieved by steam treatment methods and the like as, for example, described in Australian Patent 606,317 and Australian Patent Application 61,915/80.

In some circumstances, it may be desirable to alter the moisture content of the crop or fiber, when at ambient temperature, following compaction so as to provide an ideal moisture content for long term storage purposes. Again, this can be achieved by additional heating or steam treatment following the previously described compaction process.

Use of the above described embodiments allows on the one hand compaction of crops or fibers using less compaction energy than has previously been required for the same task and on the other hand, allows greater control of the density achieved whereby optimum crop/fiber densities for packing into particular volumes can be achieved. For example, hay or wool an optimum compaction density of about 640 Kg/m$^3$ allows the compacted hay or wool to fill a 20 foot container so that the filled container is at maximum allowable payload.

EXAMPLE 1

One specific example is the compaction of hay (where "hay" is stored fodder made from a variety of crops).

Hay would normally be pressed into bales at ambient temperatures, at a moisture content of 18% mc+2%, and a density of 160 Kg/m$^3$ to 200 Kg/m$^3$.

Conventionally, hay is compacted ("Double-Dumped") to reduce its bulk for export and thereby reduce the cost of ocean freight when it is packed into containers at a final density of around 320 Kg/m$^3$. Practice has shown that to reduce the chance of mould growth the hay needs to be packed at a moisture content of less than 12% preferably less than 10% mc (moisture content). However, hay cannot be successfully made at this low moisture content as at will suffer "leaf shatter" and hence suffer a loss of nutritional value and a reduction of crop yield in Tonnes/Ha. Therefore, the current industry practice is to make hay conventionally at 18% mc+2% mc (ideal conditions) and then store it to dry out naturally over a period of one month to four months. Once dry, it is then unstacked, unbound, teased apart and fed into a compression chamber to be recompressed to "double dumped" stage. The double dumping machinery expensive (approximately $250,000.00 for a machine with a daily average capacity of 30 to 40 tonnes or 3–4 tonnes/hour).

By the application of moisture and temperature together, according to embodiments of the present invention, naturally dry hay (<12% mc) can be baled and compacted to "double dumped" densities of 320 Kg/m$^3$ or higher with less than half the force compared to conventional means (ambient temperature and <120% mc). A means for applying moisture and temperature together is to apply steam to the hay immediately prior to baling in the field. An alternative is to bring hay to a stationary compression machine where heat and temperature are applied to the hay (by steam) immediately prior to compaction. Our experience has shown that the application of steam in raising the temperature of the hay to at least 70° C. and adjusting the moisture to 18% to 20% can reduce the compression force for double dumping to between a third and a quarter of the force required otherwise. If the steam is superheated it may also dehydrate a moist crop down to an ideal moisture content of 20% mc. The application of steam (temperature) ensures that the hay dries rapidly (within hours) so that its final state is dry (<12% mc) and dense.

EXAMPLE 2

Conventionally, wool is pressed into bales in the shearing shed. It is then transported as a bulky commodity to major collection points, usually at a port, where it is later double or triple dumped to fit into 20 foot containers to reduce ocean freight charges. By the application of embodiments of the present invention, through steam or microwaves, wool can be pressed more densely on-farm. This will reduce domestic freight and storage costs.

Typically wool is double dumped to bale densities of the order of 300 kg/m$^3$ requiring compaction pressures of the order of 0.1 to 0.3 MPa. Typical moisture content is less than 15% mc.

Utilisation of the apparatus of either FIG. 1 or FIG. 2 so as to raise temperature of the wool to at least 60° C. during compression will allow densities of up to 640 kg/m$^3$ to be achieved for a compression pressure of the order of half to one third otherwise required.

Increase of moisture content by around 5% mc also enhances the reduction in pressure required to achieve a given density.

EXAMPLE 3

Figure 6:
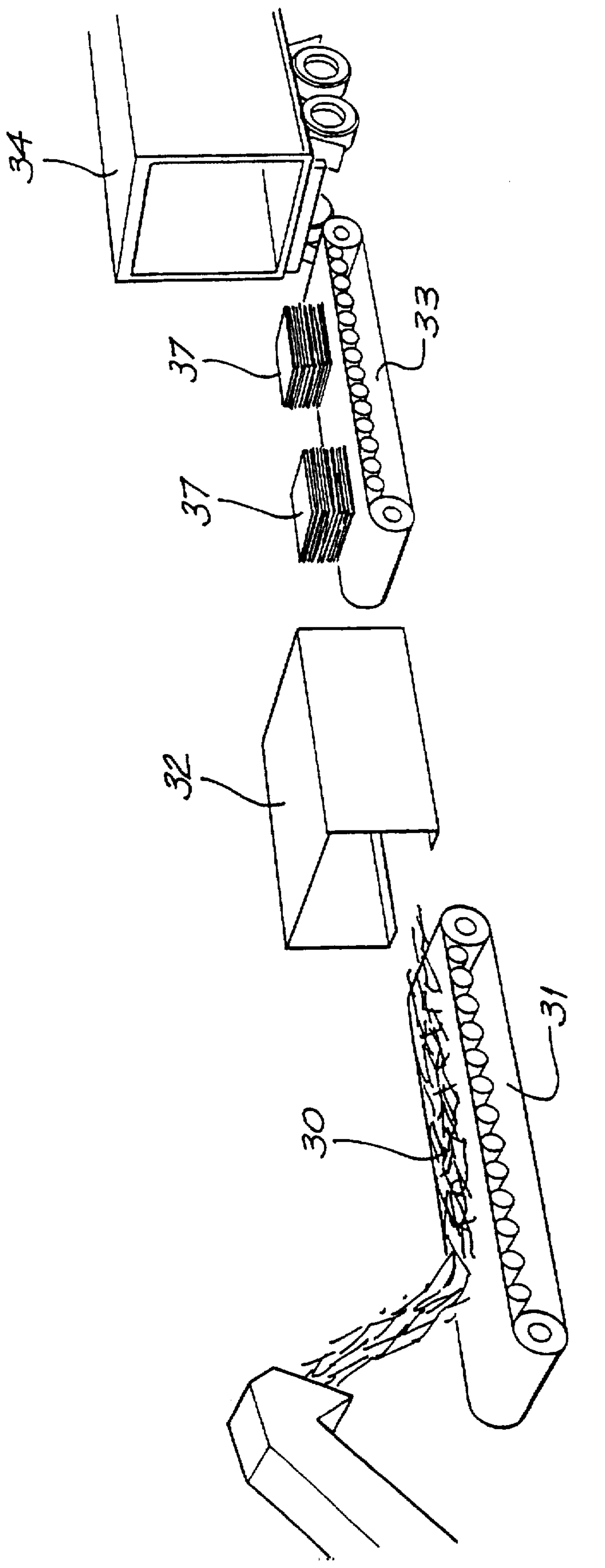
FIG. 6 is a diagrammatic view of a compaction apparatus according to a third embodiment of the invention for processing of crop or fiber at the point of harvesting.

With reference to FIG. 6 a particular example of the process of the invention applied in the field is illustrated.

A harvested crop 30 is transported on input conveyor 31 to compactor 32. Compactor 32 can take the form of the compactor of FIG. 1 or the compactor of FIG. 2 wherein the temperature and/or humidity of crop 30 is raised a predetermined amount above its base temperature and humidity (that is the conditions pertained to the crop on conveyor 31) and then compacting the crop for discharge onto discharge conveyor 33. Discharge conveyor 33 conveys the compressed crop to transporter 34. Examples of particular crops which can be processed according to the apparatus illustrated in FIG. 6 include the following:

Hay/Straw

Hay/straw is harvested at a base temperature of ambient and a base moisture content of less than 40% as presented on conveyor 30. Within compactor 32 the base temperature is elevated by a minimum of 20° C. degrees and the base moisture content is elevated by about 5% mc at which time compression takes place at a pressure of approximately 0.35 MPa for a density of 300 $Kg/m^3$. The resulting bale is discharged onto conveyor 33.

This is to be compared with a pressure of 0.7 MPa if the hay/straw is compacted at ambient temperature and moisture content.

Wool

Wool is harvested at a base temperature of ambient and a base moisture content of about 15% mc as presented on conveyor 30. Within compactor 32 the base temperature is elevated by at least 20° C. and the base humidity is elevated by about 5% mc at which time compression takes place at a pressure of approximately 0.25 MPa for a density of 300 $kg/m^3$. The resulting bale is discharged onto conveyor 33.

This is to be compared with a pressure of 0.3 MPa if the wool is compacted at ambient temperature and mc.

Cotton

Cotton is harvested at a base temperature of ambient and a typical base moisture content of 5–20% mc as presented on conveyor 30. Within compactor 32 the base temperature is elevated by about a minimum of 20° C. at which time compression takes place at a pressure of approximately 0.3–1 MPa depending on fiber type. The resulting bale is discharged onto conveyor 33.

If moisture content is elevated prior to or during compaction then improved compaction for a given pressure is noted.

Copra

Copra is harvested at a base temperature of ambient and a typical base moisture content of 5–20% mc as presented on conveyor 30. Within compactor 32 the base temperature is elevated by about a minimum of 20° C. at which time compression takes place at a pressure of approximately 0.25–1 MPa depending on fiber type. The resulting bale is discharged onto conveyor 33.

If moisture content is elevated prior to or during compaction then improved compaction for a given pressure is noted.

Bagasse

Bagasse is harvested at a base temperature of ambient and a typical base moisture content of 5–20% mc as presented on conveyor 30. Within compactor 32 the base temperature is elevated by about a minimum of 20° C. at which time compression takes place at a pressure of approximately 0.25–1 MPa depending on fiber type. The resulting bale is discharged onto conveyor 33.

If moisture content is elevated prior to or during compaction then improved compaction for a given pressure is noted.

EXAMPLE 4

Figure 7:
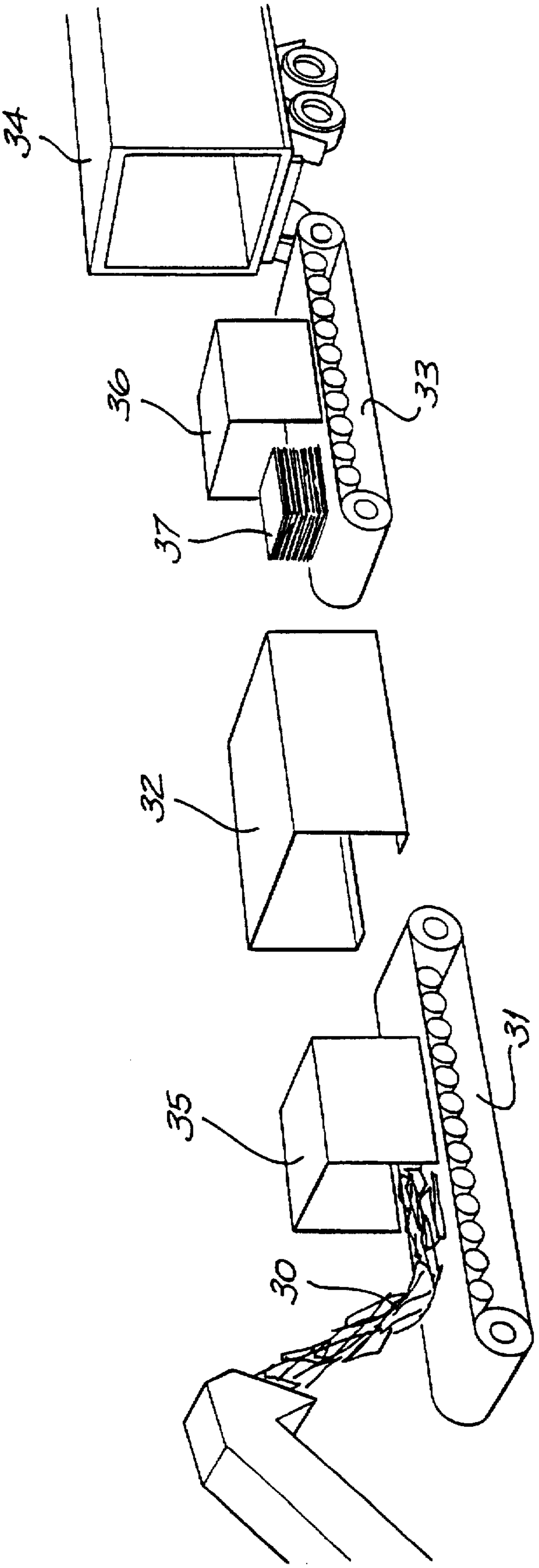
FIG. 7 is a diagrammatic view of compaction apparatus according to a fourth embodiment of the invention incorporating pre and/or post processing of compacted crop or fiber.

With reference to FIG. 7 an assembly of generally similar configuration to that illustrated in FIG. 6 is shown comprising input conveyor 31, compactor 32 and discharge conveyor 33. In this example a pre-processor unit 35 treats crop 30 as It moves on conveyor 31.

A post processor unit 36 treats crop in baled form on conveyor 33.

Pre-processor 35 and post processor 36 can take substantially the form of the devices illustrated and described in respect of either FIG. 1 or FIG. 2. The degree to which the capabilities of these devices are utilised can be varied in order to on the one hand allow compactor 32 to compact the crop 30 at a lower compaction pressure than would otherwise be the case and also to ensure that the moisture content of the baled product 37 leaving discharge conveyor 33 Is at or will relatively soon achieve a predetermined moisture content which is appropriate for medium to long-term storage purposes of the crop in compressed form.

For example a pre-processor 35 can be utilised only to alter the humidity or moisture content of the crop 30 prior to presentation to compactor 32. Compactor 32 can then be utilised only to heat and compress or alternatively be used to alter the moisture content further as well as to heat and compress the crop.

Post processor 36 can be utilised to either further raise or lower the moisture content of the baled product 37 when it first appears on discharge conveyor 33. Heating can be performed in conjunction with this. For example post processor 36 can inject steam into the baled product 37 so as to further raise its moisture content whilst also further heating the baled product whereby ultimately the moisture content of the baled product will drop as the baled product 37 cools after discharge from conveyor 33. Alternatively super heated steam can be applied to post processor 36 to baled product 37 whereby the baled product is both heated and its moisture content is reduced whilst passing through post processor 36. Ultimately it can be expected that the moisture content will drop further as the baled product 37 cools after discharge from conveyor 33.

It will be observed that the selective combination and utilisation of pre-processor 35, compactor 32 and post processor 36 can provide relatively rigorous control of both the temperature and moisture content of harvested crop 30 and baled product 37.

The above describes only some embodiments of the present invention and modifications obvious to those skilled in the art can be made thereto without departing from the scope and spirit of the present invention.

INDUSTRIAL APPLICABILITY

Examples of the invention have particular applicability where it is desired to optimise containerised transport of crops and fibrous materials following harvesting thereof or otherwise to bale or pack harvested crop for storage or transport.

We claim:

1. A method of compacting after harvesting a fibrous material in its harvested form, said method comprising applying a mechanical compacting force to said material in its harvested form no earlier than subjecting said material in its harvested form to an elevated temperature above a base reference temperature and adjusting moisture content condition of the material in its harvested form to above a base reference moisture content condition whereby said material in its harvested form is compressed to a compressed state of predetermined density using less compacting force than would otherwise be the case if compression were applied at said base reference temperature and said base reference moisture content condition.

2. The method of claim 1, wherein said steps of subjecting said material to an elevated temperature and an elevated moisture content condition are performed by applying steam to said material.

3. The method of claim 2, wherein said steps of subjecting said material to an elevated temperature and an elevated moisture content condition are performed respectively by the application of microwave energy and the application of steam.

4. The method of claim 1, wherein moisture is removed from said material after said compaction by subjecting said material to superheated steam.

5. The method of claim 1, wherein moisture is removed from said material after said compaction by application of a hot air blast.

6. The method of claim 1, wherein moisture is removed from the crop after said compaction by the application of microwave heating.

7. The method of claim 1 wherein the fibrous material is hay or straw.

8. The method of claim 1 wherein the fibrous material is wool.

9. The method of claim 1 wherein the fibrous material is cotton.

10. The method of claim 1 wherein the fibrous material is copra.

11. The method of claim 1 wherein the fibrous material is any one of bagasse, flax, jute or kenaff.

12. Apparatus for compacting after harvesting a fibrous material in its harvested form, said apparatus including mechanical compacting means adapted to compact said material in its harvested form; said apparatus further including heating means and moisture content altering means; said heating means adapted to heat said material in its harvested form to an elevated temperature above a base reference temperature; said moisture content altering means adapted to apply to said material in its harvested form an elevated moisture content condition above a base reference moisture content condition during compaction of said material in its harvested form whereby said material is compressed to a compressed state of predetermined density using less compacting force than would otherwise be the case.

13. The apparatus of claim 12, wherein said mechanical compacting means comprises a combination of groups of generally opposed planar plates.

14. The apparatus of claim 13, wherein said groups of plates act through different axes.

15. The apparatus of claim 14, wherein said groups of plates act through mutually orthogonally opposed axes.

16. The apparatus of claim 12, wherein said heating means comprises microwave generation means which heats only said material and not said mechanical compacting means.

17. The apparatus of claim 12, wherein said moisture content altering means comprises a source of steam.

18. The apparatus of claim 17, wherein said moisture content altering means comprises super heated steam.

19. The apparatus of claim 17, wherein said moisture content altering means comprises a fine mist of water.

20. The apparatus of claim 12, wherein steam generating means is utilized both as said heating means and as said moisture content altering means.

21. The apparatus of claim 12 further including pretreatment means for altering the moisture content of said baled material prior to treatment by said mechanical compacting means.

22. The apparatus of claim 12 further including post treatment means for altering the moisture content of said material after compaction by said mechanical compacting means.

* * * * *